United States Patent
Cuthbert

[11] 3,859,522
[45] Jan. 7, 1975

[54] METHOD FOR NON-DESTRUCTIVE TESTING OF FISH FOR SEX

[75] Inventor: Robert M. Cuthbert, Delta, B.C., Canada

[73] Assignee: British Columbia Research Council, Vancouver, British Columbia, Canada

[22] Filed: May 15, 1973

[21] Appl. No.: 360,526

[52] U.S. Cl. .......................... 250/223 R, 209/111.7
[51] Int. Cl. ............................................ H01j 39/12
[58] Field of Search .................. 250/221, 222, 223; 209/111.7, 111.5

[56] References Cited
UNITED STATES PATENTS

| | | | |
|---|---|---|---|
| 3,255,660 | 6/1966 | Hirt | 209/111.7 |
| 3,275,136 | 9/1966 | Allen | 209/111.7 |
| 3,515,273 | 6/1970 | Seaborn | 209/111.7 |
| 3,517,807 | 6/1970 | Van Gaalen | 209/111.7 |
| 3,540,824 | 11/1970 | Fonda | 250/221 |
| 3,609,306 | 9/1971 | Langley | 250/219 D |
| 3,628,657 | 12/1971 | Billett | 250/223 |
| 3,746,166 | 7/1973 | Van Gaalen | 209/111.7 |

*Primary Examiner*—James W. Lawrence
*Assistant Examiner*—D. C. Nelms
*Attorney, Agent, or Firm*—Fetherstonhaugh & Co.

[57] ABSTRACT

Method and apparatus for testing whole fish for sex utilizing the high light transmitting or light scattering properties of roe in female fish relative to the low light transmitting or light scattering properties of milt in male fish to distinguish the female from the male.

3 Claims, 4 Drawing Figures

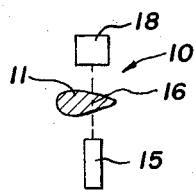
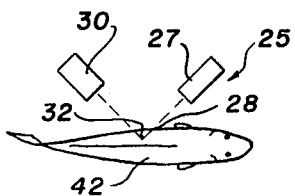
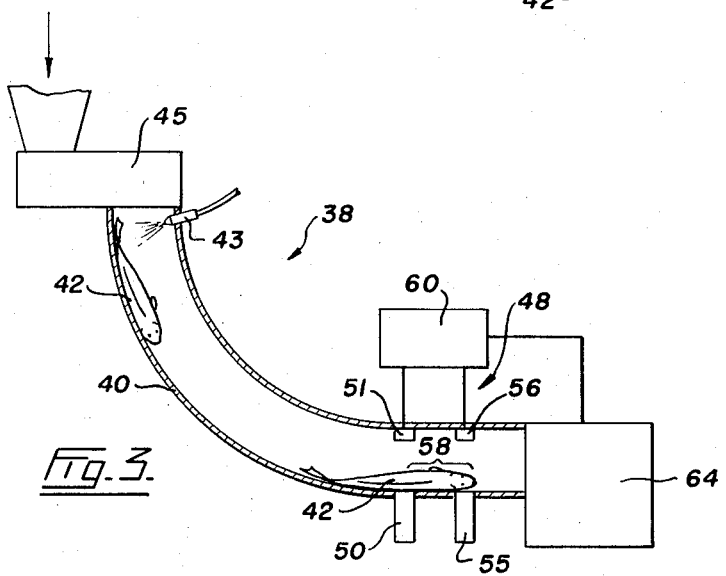
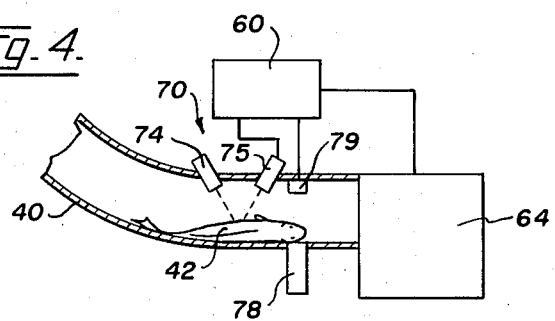

METHOD FOR NON-DESTRUCTIVE TESTING OF FISH FOR SEX

This invention relates to a method for the non-destructive testing of whole fish for sex.

It has not been possible heretofore to determine the sex of whole fish in a rapid and economical manner. As a result, it has not been practical to separate male whole fish from female whole fish, and this often results in the loss of fish for certain purposes. In herring roe extracting plants, it is desirable to age the fish in the presence of salt in order to firm up the roe for extracting and handling, during which time there is a deterioration of the fish. As it has not been possible in a practical way to detect the female fish, all fish are subjected to this treatment with the result that the male fish are degraded and are no longer available for processing as fresh fish. When applied commercially, sorting by sex in accordance with the present invention will permit greater utilization of the fishery resource and will provide substantial savings in process time and equipment. For example, there will be a great reduction in the amount of salt required and in the number of people needed for handling the fish.

The present invention alleviates the problem since it enables the sex of the fish to be determined while they remain in whole and fresh condition, and it makes is possible automatically to separate the male fish from the female fish.

The method according to the present invention utilizes the high light transmitting or light scattering properties of roe in female fish relative to the low light transmitting or light scattering properties of milt in male fish to distinguish the female fish from the male fish. This can be done very rapidly without cutting or otherwise damaging the fish.

A rapid non-destructive method of testing whole fish for sex comprises applying radiant energy to the gonads region of a whole fish, and detecting resultant energy emanating from said region, the magnitude of the detected energy relative to that applied providing an indication of the sex of the fish, the roe in a female fish causing a higher energy emanation than the milt in a male fish.

This method can be carried out in either of two ways. One, light is directed from a light source of constant intensity on to one side of the gonads region of the fish, and energy transmitted through said region is detected on the opposite side thereof. If the transmitted energy reaches a predetermined level, it is a female fish being tested, otherwise it is a male fish. Two, light is directed from a light source on to a first area on one side of the fish and adjacent the gonads region thereof, and energy reflected and scattered from a second area on the same side of the fish is detected. Here again, if the detected energy reaches a predetermined level, it is a female fish, otherwise it is a male fish.

The present method makes it possible to sort fish automatically according to sex in a very rapid and economical manner. Light energy is directed through or against each fish, and the transmitted or reflected energy is utilized to direct female fish one way and the male fish another way, or vice versa.

Apparatus for carrying out the method of this invention is relatively simple, and yet is quite effective. The apparatus comprises means for applying radiant energy to the gonads region of a whole fish, and means for detecting resultant energy emanating from said region. The magnitude of the detected energy relative to the applied energy provides an indication of the sex of the fish since roe in a female fish causes a higher energy emanation than milt in a male fish.

In one form of apparatus, the energy applying means is positioned to direct the energy on to one side of the gonads region, and the detecting means is positioned to receive the resultant energy from the opposite side of said region. The energy applying means may be a light source of constant intensity, and the detecting means may be a photo-responsive device or the like.

In another form of the apparatus, the energy applying means is positioned to direct energy on to a first area on one side of the fish adjacent the gonads region thereof, and the detecting means is positioned to receive the resultant energy from a second area adjacent the first area and on the same side of the fish. The energy applying means may be a light source of constant intensity positioned to direct a beam of light on to the first area, and the detecting means may be a photo-responsive device or the like positioned to detect light from the second area.

Examples of apparatus for carrying out this invention are illustrated in the accompanying drawings, in which FIG. 1 diagrammatically illustrates one form of the apparatus, FIG. 2 diagrammatically illustrates an alternative form of the apparatus, FIG. 3 diagrammatically illustrates a commercial form of apparatus based on the form of the invention illustrated in FIG. 1, and FIG. 4 diagrammatically illustrates a commercial form of apparatus based on the form of the invention illustrated in FIG. 2.

Referring to FIG. 1 of the drawings, 10 is one form of testing apparatus in accordance with this invention acting on a fish 11 shown in cross-section in this view. Apparatus 10 includes a light source 15 of constant intensity arranged to direct a beam of light through the gonads region 16 of the fish on one side thereof. The apparatus also includes a detector 18 positioned on the opposite side of the fish directly opposite light source 15 to receive light transmitted through the gonads region from the source. The detector 18 may be a photo-responsive device or the like which detects and indicates the amount of light received by transmission through the gonads region. A male fish is indicated by a small response attributable to the low transmittance characteristic of the milt which forms a significant portion of the optical path for the male, whereas a female fish is indicated by a relatively greater response attributable to the higher transmittance characteristic of the roe which forms a comparably significant portion of the optical path of the female fish.

FIG. 2 diagrammatically illustrates an alternative form of testing apparatus 25. This apparatus includes a light source 27 of constant intensity arranged to direct a beam of light against a first area 28 of the fish on one side thereof and near the gonads region. A suitable detector 30, such as a photo-responsive device or the like, is positioned on the same side of the fish and is arranged to receive reflected or scattered light from a second area 32 of the fish near the first area 28.

The light source 27 directs a beam of light into the fish at the gonads region thereof, and the roe or milt in this region reflects or scatters the light in varying degrees of intensity. The roe in the female fish reflects or scatters light of greater magnitude than the milt in the male fish.

FIG. 3 diagrammatically illustrates a commercial form of apparatus for carrying out the present invention. Apparatus 38 includes a curved pipe 40 for conveying fish 42 by gravity. If necessary, water may be sprayed into the upper end of the pipe in any suitable manner, such as by means of a nozzle 43. It is preferable to provide suitable means for causing the fish to move head first down the pipe, and this may be accomplished by a suitable vibrator or other means indicated at 45. As the fish slide down pipe 40, they travel through sex sensing apparatus 48.

Apparatus 48 includes a light source 50 of constant intensity and a photo-responsive device 51 located on opposite sides of the path along which the fish travel. A second light source 55 and a second photo-responsive device 56 are also located on opposite sides of the fish path but spaced downstream a distance corresponding to that between the head and the gonads region of a fish, this distance being indicated by the numeral 58. When the head of a herring arrives at the 55, 56 location, the reduced transmission of energy from source 55 is sensed by the photo-responsive device 56, and this triggers a signal for a gate portion 60 which includes electronic circuitry comprising a simple electronic gate followed by a discriminator. This gate accepts signals from the photo-responsive device 51 only for a time period when the gonads region of the fish is in position for detection between light source 50 and detector 51. The discriminator accepts those signals from the gate which are above a specific amplitude, which are indicative of a female fish. The output signal from the discriminator activates an electromechanical diverter 64 which is designed to displace the discharge path of the fish so that, in responsive to input signals, said diverter mechanically sorts the female fish from the male.

FIG. 4 diagrammatically illustrates apparatus 38a which is the same as apparatus 38, excepting that sex sensing apparatus 70 has displaced sensing apparatus 48. Apparatus 70 includes a constant intensity light source 74 arranged relative to pipe 40, and a photoresponsive device 75 on the same side of the pipe and arranged relative thereto. Opposite constant intensity light source 78 and photo-responsive device 79 are also provided. Sensors 74 and 79 are connected to the same circuitry as sensors 51 and 56.

When the head of a fish moves between light source 78 and sensor 79, the reduced transmission of energy from this source is sensed by device 79, and this triggers a signal to gate portion 60. This gate portion accepts signals from sensor 75 only for a time period when the gonads region of the fish is in position for detection by light source 74 and detector 75. The discriminator accepts those signals from the gate which are above a specific amplitude, which are indicative of a female fish. The diverter 64 is operated to displace the discharge path in accordance with the signal received.

I claim:
1. A rapid non-destructive method of testing whole fish for sex, which comprises directing radiant energy in to the gonads region of a whole fish, and detecting resultant energy emanating from said region, the magnitude of the detected energy relative to that applied providing an indication of the sex of the fish, roe in a female fish causing a higher energy emanation than milt in a male fish.

2. The method as claimed in claim 1 in which light is directed from a light source of constant intensity in to one side of the gonads region of the fish, and energy transmitted through said region is detected on the opposite side thereof.

3. The method as claimed in claim 1 in which light is directed from a light source of constant intensity in to a first area on one side of the fish and adjacent the gonads region thereof, and energy reflected and scattered from a second area on the same side of the fish is detected.

* * * * *

Disclaimer 3,859,522.—*Robert M. Cuthbert*, Delta, British Columbia, Canada. METHOD FOR NON-DESTRUCTIVE TESTING OF FISH FOR SEX. Patent dated Jan. 7, 1975. Disclaimer filed June 30, 1977, by the assignee, *British Columbia Research Council.*

Hereby enters this disclaimer to claims 1 and 2 of said patent.

[*Official Gazette November 15, 1977.*]